No. 728,428. PATENTED MAY 19, 1903.
W. VARZAR.
ELEVATED ELECTRIC RAILWAY.
APPLICATION FILED OCT. 27, 1899.
NO MODEL.
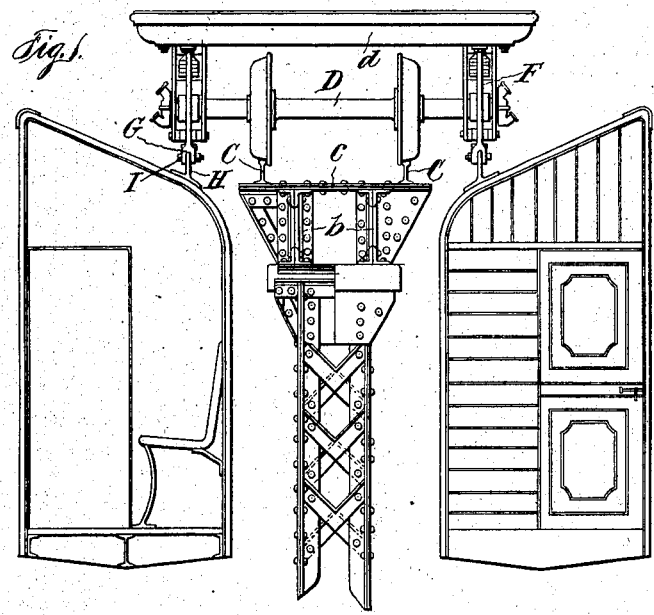
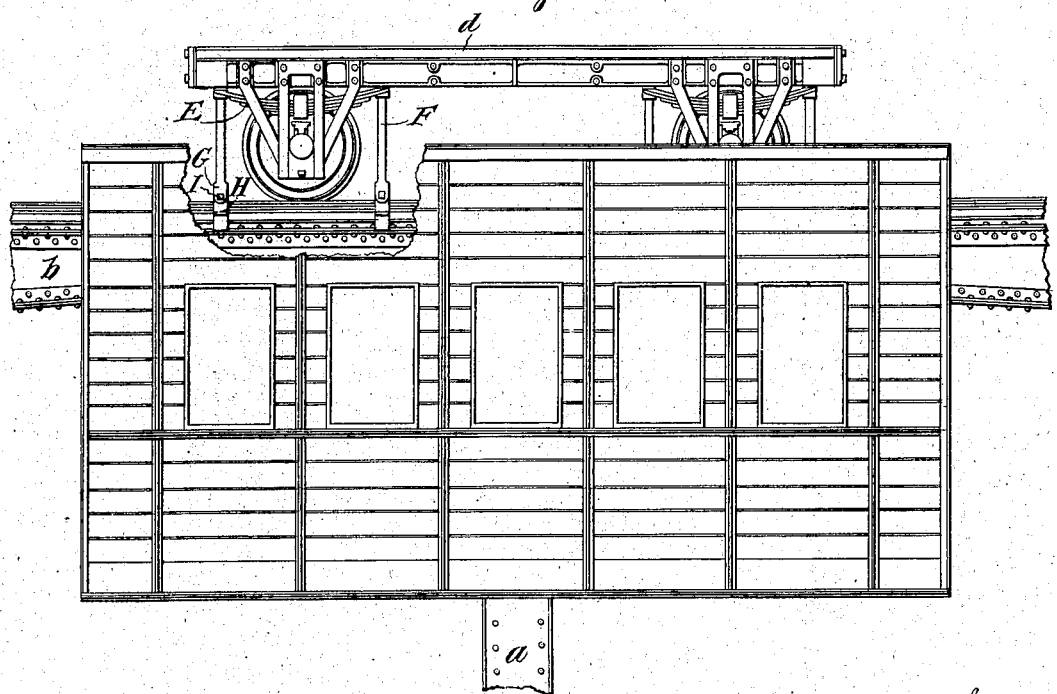

No. 728,428.

Patented May 19, 1903.

UNITED STATES PATENT OFFICE.

WASSILY VARZAR, OF ST. PETERSBURG, RUSSIA.

ELEVATED ELECTRIC RAILWAY.

SPECIFICATION forming part of Letters Patent No. 728,428, dated May 19, 1903.

Application filed October 27, 1899. Serial No. 734,957. (No model.)

*To all whom it may concern:*

Be it known that I, WASSILY VARZAR, a subject of the Emperor of Russia, and a resident of St. Petersburg, Russia, have invented certain new and useful Improvements in Elevated Electric Railways, of which the following is a specification.

My invention relates to elevated railways, and has for its object a novel arrangement of depending cars and other features to be hereinafter particularly described and claimed.

Referring to the drawings, in which like parts are similarly designated, Figure 1 is an end view of the track, truck, and suspended cars; and Fig. 2 is a side view thereof with part of one of the cars broken away to show the suspension from the truck.

Upon a series of suitable posts or columns $a$, cast or built up or of wood, according to the local conditions or importance of the railway, are secured beams or girders $b$ of any desired or convenient form and of sufficient strength to carry the designed load. On this overhead way are placed metallic ties or sleepers $c$, that carry the rails C. A truck $d$, here shown as a four-wheeled truck, travels over the elevated track. The wheel-axles D of the truck $d$ support springs E, and said springs support the body of the truck. Suitable means are used to suspend the cars $f$ from the truck independently from one another and are here shown as rods F passing through the ends of the springs and having bifurcated ends G, in which is held a suitable metallic bracket H by means of a bolt I, as shown. The cars being supported much above their center of gravity very stable conditions are arrived at.

Having thus described my invention, what I claim as new therein, and desire to secure by Letters Patent, is—

1. In combination, an overhead railway-track, a wheeled truck and a car suspended independently from each side of said truck, substantially as set forth.

2. In combination, an overhead railway-track, a wheeled truck, a car on each side of the truck and resilient suspension devices connected with the truck and from which the cars are independently suspended, substantially as set forth.

In witness whereof I have hereunto set my hand in presence of two witnesses.

WASSILY VARZAR.

Witnesses:
 N. TSCHEKALOFF,
 Z. BLAU.